(No Model.)
B. G. MERRILL.
LEVELING APPARATUS.
No. 494,876. Patented Apr. 4, 1893.
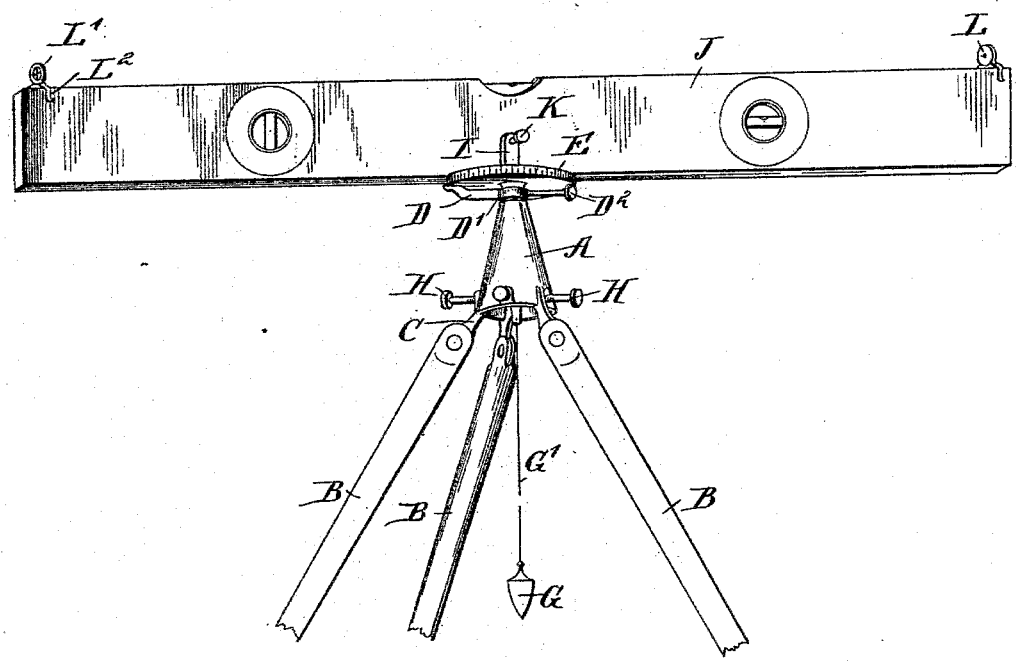
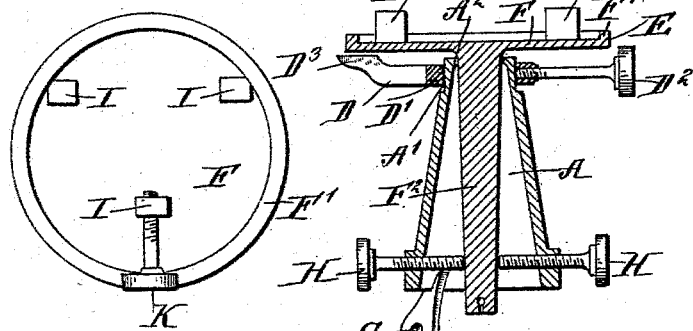
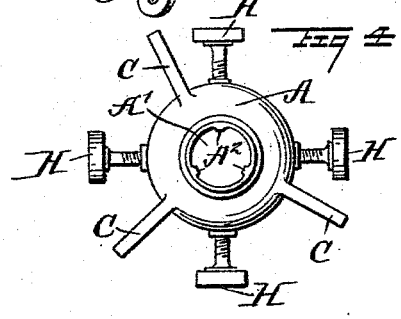
WITNESSES:
H. Walker
C. Sedgwick
INVENTOR
B. G. Merrill
BY Munn & Co.
ATTORNEYS.

UNITED STATES PATENT OFFICE.

BELA G. MERRILL, OF OAK PARK, ILLINOIS.

LEVELING APPARATUS.

SPECIFICATION forming part of Letters Patent No. 494,876, dated April 4, 1893.

Application filed October 24, 1892. Serial No. 449,860. (No model.)

*To all whom it may concern:*

Be it known that I, BELA G. MERRILL, of Oak Park, in the county of Cook and State of Illinois, have invented a new and Improved Leveling Instrument, of which the following is a full, clear, and exact description.

The invention relates to instruments used for the purpose of leveling and squaring buildings, establishing grades, platting lands, &c.

The object of the invention is to provide a new and improved leveling instrument, which is simple and durable in construction, and more especially designed for the use of builders, carpenters, masons and other mechanics, for expediting and facilitating the work of leveling and squaring walls and other parts of buildings, with greater accuracy and in much less time than by the usual process of using the common straight-edge and level.

The invention consists principally of a hollow stand, and a transit supported on the said hollow stand and adapted to carry a level provided with sights.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1 is a perspective view of the improvement. Fig. 2 is an enlarged sectional side elevation of the stand and transit. Fig. 3 is a plan view of the transit. Fig. 4 is a plan view of the stand; and Fig. 5 is an enlarged front view of one of the sights.

The improved leveling instrument is provided with a hollow stand A, preferably made in the shape of a truncated cone and connected with legs B pivoted on lugs C projecting from the base end of the said stand, as is plainly shown in Fig. 1. The legs may be dispensed with, as it is sometimes found desirable that the stand should be set immediately on the wall or sill of a building, the said stand then being set with its lugs C on the desired place.

The upper end of the stand A is formed with a cylindrical bearing A' engaged by the hub D' of a pointer D, adapted to be turned with its hub on the said bearing and raised or lowered thereon, and fastened in place by a set screw $D^2$ screwing in the hub against the said bearing A'. The outer end of the pointer D is formed with a knife-edge $D^3$ adapted to indicate on a graduation E formed on the peripheral surface of a circular flange F' formed on the transit F, made in the shape of a disk and provided at its under side, in the center, with a tapering stem $F^2$ set at its upper end on lugs $A^2$ projecting inward from the hollow stand A at the bearing A'. On the lower end of this stem $F^2$ is secured the cord G' of the plumb G of the usual construction. The lower end of the stem $F^2$ is adapted to be secured in the proper position by a series of set screws H screwing in the stand A, as is plainly shown in Figs. 1, 2 and 4.

On the top of the transit F are secured lugs I, between which is placed the level J of any approved construction, the said level resting with its under side on the top edge of the flange F' of the transit F previously mentioned. The level J is secured in place on top of the transit F by a set screw K screwing in one of the lugs I, so that the level is prevented from slipping or accidental displacement on the transit.

On top of the level J, and near the ends thereof, are set sights L and L', each attached to a cross bar $L^2$ fitting snugly on top of the level J. On the ends of this cross bar $L^2$ are fastened downwardly-extending, curved springs $L^3$, adapted to engage the sides of the level J, so as to hold the corresponding sight in proper position on the level. As illustrated in Figs. 1 and 5, one of the levels is provided with the usual cross, while the other has the usual miniature opening.

The graduation E indicates degrees of a circle, for the purpose of obtaining angles by using the index pointer D held adjustably on the bearing A' of the stand A. The pointer D must be made vertically adjustable so as to permit of tilting the transit F to obtain the desired inclination of the level J, and a vertical as well as a reciprocal adjustment of the index pointer D is necessary as the degree of the required angle may render necessary the lowering or raising of the index, owing to the inclination of the stand A with reference to the transit F. The stem $F^2$ is made tapering and set on the lugs $A^2$ so as to secure an accurate bearing at all or any required inclination or deviation from the perpendicular of the stand A.

In adjusting the instrument it is obvious that the stem $F^2$ of the transit F will have a firm and equal bearing at any required angle, as the tapering stem comes in contact with the lugs $A^2$ at the apex of the hollow stand A. After having set the stand A or tripod formed by the legs B where required, by placing the stem $F^2$ of the transit F in the aperture of the stand, as explained, the adjustment of the level J is readily effected by means of the adjusting screws H engaging the stem $F^2$. The stand A is preferably made hollow and conical so as to permit the stem $F^2$ to move in considerable latitude for the purpose mentioned.

By means of the plumb G the operator is enabled to locate the exact center of the instrument vertically above any desired point.

Having thus fully described my invention, I claim as new and desire to secure by Letters Patent—

1. The combination with the hollow stand having transverse adjusting screws, of the peripherally graduated disk having means for securing a spirit level to its upper side and on its lower side provided with a central stem depending within said stand between the screws, and the pointer having a collar embracing the upper end of the stand and provided with a clamping screw substantially as described.

2. A leveling instrument, comprising a hollow stand provided at its upper end with inwardly-projecting bearing lugs, a transit made in the shape of a disk having a graduated rim and provided with a tapering stem set on the said lugs of the stand, and set screws screwing in the said hollow stand near the base end thereof to engage the lower part of the said stem of the transit, substantially as shown and described.

3. A leveling instrument, comprising a hollow stand provided at its upper end with inwardly-projecting bearing lugs, a transit made in the shape of a disk having a graduated rim and provided with a tapering stem set on the said lugs of the stand, set screws screwing in the said hollow stand near the base end thereof to engage the lower part of the said stem of the transit, and lugs secured on the top of the said transit and adapted to engage the sides of the level to hold the latter in place, substantially as shown and described.

4. A leveling instrument, comprising a hollow stand provided at its upper end with inwardly-projecting bearing lugs, a transit made in the shape of a disk having a graduated rim and provided with a tapering stem set on the said lugs of the stand, set screws screwing in the said hollow stand near the base end thereof to engage the lower part of the said stem of the transit, lugs secured on the top of the said transit and adapted to engage the sides of the level to hold the latter in place, and a set screw engaging one of the said lugs for fastening the level in position, substantially as shown and described.

5. A leveling instrument, comprising a hollow stand provided at its upper end with inwardly-projecting bearing lugs, a transit made in the shape of a disk having a graduated rim and provided with a tapering stem set on the said lugs of the stand, set screws screwing in the said hollow stand near the base end thereof to engage the lower part of the said stem of the transit, lugs secured on the top of the said transit and adapted to engage the sides of the level to hold the latter in place, and a plumb bob held on a cord attached to the lower end of the said stem, substantially as shown and described.

BELA G. MERRILL.

Witnesses:
RAY MERRILL,
GEO. B. WOODBRIDGE.